C. L. VETTER.
INCUBATOR.
APPLICATION FILED FEB. 23, 1910.
978,520.
Patented Dec. 13, 1910.
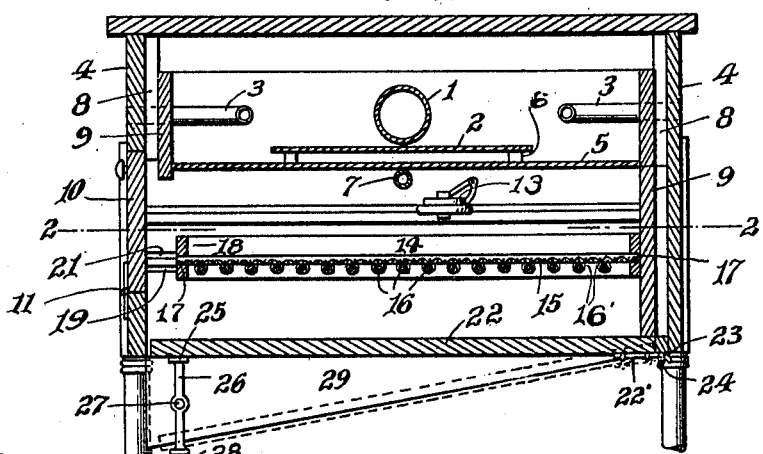
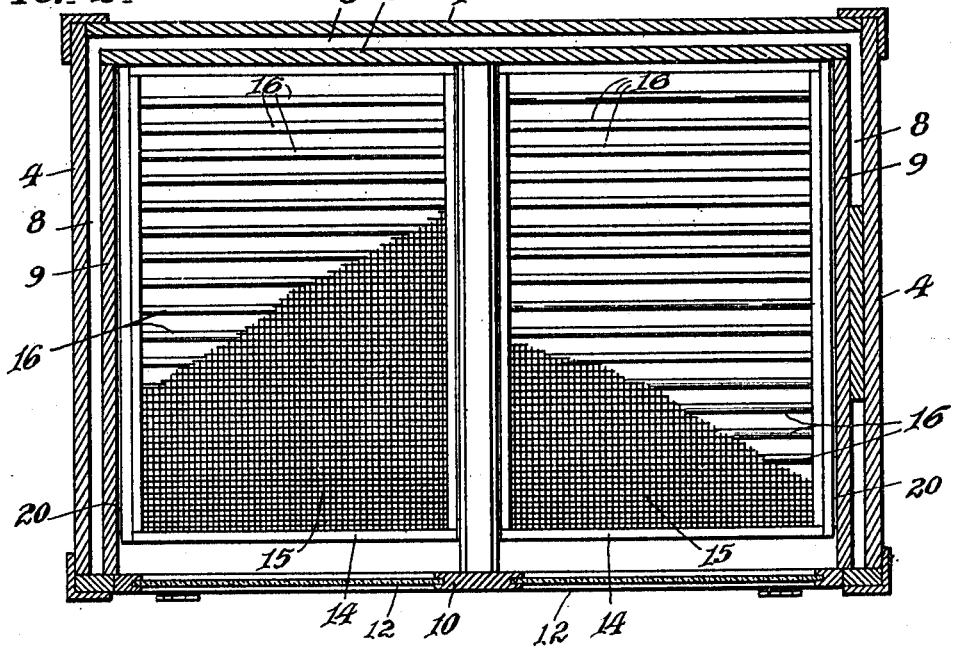
Witnesses
M. A. Bond.
Joseph B. Bryan.
Inventor
Charles L. Vetter
By William Steell Jackson
Attorney

UNITED STATES PATENT OFFICE.

CHARLES L. VETTER, OF PHILADELPHIA, PENNSYLVANIA.

INCUBATOR.

978,520.  Specification of Letters Patent.  Patented Dec. 13, 1910.

Application filed February 23, 1910. Serial No. 545,513.

*To all whom it may concern:*

Be it known that I, CHARLES L. VETTER, a citizen of the United States, residing at Philadelphia, in the county of Philadelphia, State of Pennsylvania, have invented a new and useful Incubator, of which the following is a specification.

My invention relates to an incubator preferably made up of three parts or compartments, and has for its several objects: to combine freely rotatable rollers or rods in the bottoms of the egg trays with removable tray bottoms above them; to permit the removable bottoms to be withdrawn from the trays without disturbing the positions of the trays in the incubator; and to protect the eggs during the shift from support upon the removable bottoms to support upon the freely rotatable rods or rollers.

For the purpose of illustrating my invention I have selected that form thereof which, after trial, seemed most practical and successful and which best embodied the principles of my invention.

Figure 1 is a transverse vertical section of an incubator embodying the preferred form of my invention. Fig. 2 is a section upon the line 2—2 of Fig. 1. Fig. 3 is a fragmentary elevation of a portion of the tray and its support.

In the drawings like characters signify corresponding parts.

I prefer to provide my incubator with an upper compartment for heating purposes, a middle compartment within which the eggs are placed and hatched, and a lower compartment which forms a nursery for the chicks as they are hatched. The upper compartment is heated by hot air conducted thereto from a lamp or heater through pipe 1. This pipe is spaced from the bottom of the compartment by means of a protecting plate 2 which assists in properly distributing the heat from the pipe 1 throughout the compartment. The ventilating pipes 3 are normally educt pipes for the air displaced by that fed into the compartment through pipe 1. They pass entirely through the outside walls 4 of the incubator and at any desired height from the bottom plate 5 of the upper compartment. The plates 2 and 5 are united through spacers 6. Pipe 7 assists in heating the middle compartment. I provide heat insulating spaces 8 along the sides of the incubator between the outer walls 4 and the lining 9. The middle compartment is made accessible through door 10 which is hinged at 11 and provided with transparent panes 12. The heat regulation within this compartment is attained through thermostat 13.

I prefer to use two egg trays 14 and provide them with removable bottoms 15 which I show as screens resting upon rollers 16 loosely supported in sockets 16'. The eggs normally rest upon the removable bottoms but are dropped to the rollers at pipping time by withdrawing the screens through the slots 17 in the end of the trays. The eggs engage the inside of the ends of the trays and are swept off without danger of spilling.

In order to keep the eggs the same height in the incubator in spite of their changed positions in the trays, the tongues 20 upon the sides of the trays 18 are changed from the slots 19 to the slots 21. When the eggs are hatched the chicks are unable to retain any hold upon the rods because of their free turning and fall through to the nursery in the bottom compartment. The floor 22 of the nursery is supported along its back edge by a bolt 22' having its end projecting in the form of a hook or pin 23 which forms a slip hinge with the sockets 24 upon the back of the frame of the incubator. The forward edge normally rests upon the lateral projections 25 of a lever 26 which is pivoted at 27 and provided with other projections 28 here shown as below the projections 25. When the lever is turned so as to swing the upper projections outwardly to free them from the end of the floor 22, this swings the other projections within the path of the bottom so as to engage it to limit its fall about the sockets 24 and to stop it in a position where the chicks can be removed but in which the ends of the space are closed by the pieces 29 in which the lever 26 is pivoted. Complete cleaning of the bottom requires a further movement of the bottom and I remove it altogether by again moving the lever to clear the bottom from the projections 28, which is done in the illustration by swinging the lever in the opposite direction from that in which it was first swung. The bottom then swings about its sockets until the pins slip out of them, and then falls freely to the ground.

Having thus described my invention, what I claim as new and desire to secure by Letters Patent is:—

1. In an incubator, an egg tray having a slot in one wall thereof, a bottom for the tray withdrawable through said slot and bars beneath said bottom to form a support for the eggs when the said bottom has been withdrawn and spaced sufficiently to let the chicks fall through.

2. In an incubator, an egg tray having a slotted frame and a plurality of bottoms, one of which is formed of independently rotatable elements and the other of which is removable through the slot.

In testimony whereof I have hereunto signed my name to this specification in the presence of two subscribing witnesses.

CHARLES L. VETTER.

Witnesses:
J. D. YOAKLEY,
JAS. A. RICHMOND.